US011380229B2

(12) United States Patent
Carlus (10) Patent No.: US 11,380,229 B2
(45) Date of Patent: Jul. 5, 2022

(54) SYSTEM FOR DISSEMINATING VISUAL INFORMATION AND LUGGAGE ITEM FOR SUCH A SYSTEM

(71) Applicant: Rodolphe Carlus, Franconville (FR)

(72) Inventor: Rodolphe Carlus, Franconville (FR)

( * ) Notice: Subject to any disclaimer, the term of this patent is extended or adjusted under 35 U.S.C. 154(b) by 983 days.

(21) Appl. No.: 15/110,188

(22) PCT Filed: Jan. 12, 2015

(86) PCT No.: PCT/FR2015/050057
§ 371 (c)(1),
(2) Date: Jul. 7, 2016

(87) PCT Pub. No.: WO2015/104513
PCT Pub. Date: Jul. 16, 2015

(65) Prior Publication Data
US 2016/0307480 A1    Oct. 20, 2016

(30) Foreign Application Priority Data
Jan. 10, 2014    (FR) ...................................... 1450203

(51) Int. Cl.
*G06Q 30/00*    (2012.01)
*G09F 23/00*    (2006.01)
(Continued)

(52) U.S. Cl.
CPC ................ *G09F 23/00* (2013.01); *A45C 5/03* (2013.01); *A45C 13/18* (2013.01); *A45C 15/00* (2013.01);
(Continued)

(58) Field of Classification Search
CPC .... G09F 23/00; G09F 9/33; G09F 2023/0025; A45C 5/03; A45C 13/18; A45C 15/00; G06F 3/147
See application file for complete search history.

(56) References Cited

U.S. PATENT DOCUMENTS

2002/0100777 A1    8/2002    Zheng
2006/0059745 A1    3/2006    Maqui et al.
(Continued)

FOREIGN PATENT DOCUMENTS

EP    2 340 737 A1    7/2011
JP    2002-373167 A    12/2002
(Continued)

OTHER PUBLICATIONS

C. Beleznai, P. Gemeinerand C. Zinner, "Reliable Left Luggage Detection Using Stereo Depth and Intensity Cues," 2013 IEEE International Conference on Computer Vision Workshops, 2013, pp. 59-66, doi: 10.1109/ICCVW.2013.15. (Year: 2013).*
(Continued)

*Primary Examiner* — Sun M Li
(74) *Attorney, Agent, or Firm* — Nixon & Vanderhye (57) ABSTRACT

System for disseminating visual information (1) including a luggage item (2) including an electronic display device adapted for presenting visual information in the direction of the outside environment, and a remote server (3). The luggage item (2) includes a position acquisition device, a communication device and a control device. The remote server (3) includes a communication unit and a control unit for storing visual information and positioning data and for controlling the unit for communication with the luggage item. The control unit is able to determine the visual information to be transmitted to the luggage item (2) as a function of the positioning data received from the luggage item (2).

11 Claims, 3 Drawing Sheets

(51) Int. Cl.
*G06F 3/147* (2006.01)
*G09F 9/33* (2006.01)
*A45C 15/00* (2006.01)
*G09F 21/02* (2006.01)
*A45C 5/03* (2006.01)
*A45C 13/18* (2006.01)
*A45C 13/08* (2006.01)

(52) U.S. Cl.
CPC ............... *G06F 3/147* (2013.01); *G09F 9/33* (2013.01); *G09F 21/026* (2013.01); *A45C 13/08* (2013.01); *G09F 2023/0025* (2013.01)

(56) References Cited

U.S. PATENT DOCUMENTS

| | | | | |
|---|---|---|---|---|
| 2007/0007164 | A1* | 1/2007 | Lord | A61J 7/0084 206/581 |
| 2007/0018813 | A1* | 1/2007 | Liggitt | B60R 25/24 340/539.32 |
| 2007/0108005 | A1* | 5/2007 | Augenstein | A45C 13/42 190/101 |
| 2008/0004953 | A1* | 1/2008 | Ma | G06Q 30/0269 705/14.66 |
| 2008/0052168 | A1* | 2/2008 | Peters | G06Q 30/02 705/14.64 |
| 2009/0014512 | A1* | 1/2009 | Gelbman | G06Q 30/06 235/375 |
| 2009/0314677 | A1 | 12/2009 | Teggatz et al. | |
| 2010/0018088 | A1* | 1/2010 | Rajpal | A45C 13/42 40/5 |
| 2010/0175960 | A1* | 7/2010 | Moskowitz | A45C 5/14 190/11 |
| 2011/0133892 | A1* | 6/2011 | Nohr | G07C 9/28 340/10.1 |
| 2011/0205057 | A1* | 8/2011 | Sizemore | G01S 19/17 340/568.6 |
| 2012/0097495 | A1 | 4/2012 | Moore | |
| 2013/0124186 | A1* | 5/2013 | Donabedian | H04L 67/025 704/2 |
| 2014/0151173 | A1* | 6/2014 | Reh | A45C 13/42 190/18 A |

FOREIGN PATENT DOCUMENTS

| | | |
|---|---|---|
| JP | 2003-113508 A | 4/2003 |
| WO | 2006/082971 A1 | 8/2006 |

OTHER PUBLICATIONS

Z. Ting, X. Zhang and O. yuanxin, "A Framework of Networked RFID System Supporting Location Tracking," 2006 2nd IEEE/IFIP International Conference in Central Asia on Internet, 2006, pp. 1-4, doi: 10.1109/CANET.2006.279245. (Year: 2006).*

International Search Report, dated Apr. 28, 2015, from corresponding PCT Application.

* cited by examiner

SYSTEM FOR DISSEMINATING VISUAL INFORMATION AND LUGGAGE ITEM FOR SUCH A SYSTEM

FIELD OF THE INVENTION

The present invention relates to systems for disseminating visual information, comprising a luggage item and a remote server, and to luggage items for such systems for disseminating visual information.

BACKGROUND OF THE INVENTION

More specifically, the invention relates in particular to systems for disseminating visual information, comprising a luggage item, the luggage item being of the type having a shell between the environment external to the luggage item and an internal volume of the luggage item adapted to allow the transport of personal effects, the luggage item comprising a first electronic display device mounted on a first outer face of the shell of the luggage item, the first electronic display device being adapted to present visual information in the direction of the environment external to the luggage item.

Transportable luggage items are known that incorporate electronic display devices, for example to display visual animations, advertisements, information to be communicated.

Document US2009314677 discloses a bag having an electronic display screen, for example an LED display, capable of displaying advertisements, particularly while the bag is being carried by a user.

The use of such bags for communicating visual information or advertisements has drawbacks, however.

When the bag is used as travel luggage, the user of the bag may travel to many countries. The advertising saved on the luggage item and displayed by the luggage item may then no longer be intelligible to an outside observer, for example due to the fact that it is not in a language understood by the observer or is not adapted to the local culture.

The present invention is intended to improve the situation.

With the invention, it is possible to determine visual information to be transmitted to the luggage item, based on position data received from the luggage item, and thus to adapt the visual information presented by the luggage item to the geographical location and environment of the user of the luggage item.

SUMMARY OF THE INVENTION

To this end, the first object of the invention relates to a system for disseminating visual information, comprising a luggage item, the luggage item being of the type having a shell between the environment external to the luggage item and an internal volume of the luggage item adapted for the transport of personal effects, the luggage item comprising a first electronic display device mounted on a first outer face of the shell of the luggage item, the first electronic display device being adapted to present visual information in the direction of the environment external to the luggage item. The system for disseminating visual information further comprises a remote server for the luggage item. The luggage item further comprises a position acquisition device adapted to acquire position data as a function of the spatial position of the luggage item, a device for communicating with the remote server adapted to receive visual information from the remote server and to transmit the position data to remote server, and a control device adapted to store the visual information and the position data and to control the first electronic display device. The remote server comprises a unit for communicating with the luggage item, adapted to transmit the visual information to the luggage item and to receive the position data from the luggage item, a control unit adapted to store visual information and position data and to control the unit for communicating with the luggage item, the control unit being adapted to determine the visual information to be transmitted to the luggage item as a function of the position data received from the luggage item.

In various embodiments of the invention, one or more of the following arrangements may possibly be used:
- the position acquisition device is adapted to acquire and save a plurality of position data of the luggage item, each item of position data being a function of the spatial position of the luggage item at the moment of acquisition and being associated with a temporal value indicative of the moment of acquisition;
- the control device is adapted to control the first electronic display device between a dissemination state in which the first electronic display device presents the visual information in the direction of the environment external to the luggage item, and an inactive state in which the first electronic display device does not display the visual information in the direction of the environment external to the luggage item, and the control unit of the remote server is adapted to determine a visual information dissemination indicator as a function of the distance traveled by the luggage item with the first electronic display device in the dissemination state;
- the device for communicating with the remote server communicates with the remote server via a wide area network (WAN), in particular an Internet network;
- the first electronic display device is an electronic display, in particular an LED or OLED display;
- the luggage item further comprises an optical sensor adapted to capture optical information from the environment external to the luggage item, and the visual information dissemination indicator is further determined as a function of said optical information;
- the luggage item further comprises a sound sensor adapted to capture sound information from the environment external to the luggage item, and the visual information dissemination indicator is further determined as a function of said sound information;
- the communication device is adapted to transmit to the remote server a composite visual dissemination indicator based on a state indicator of the display device which indicates whether the display device is in the dissemination state or the inactive state;
- the composite visual dissemination indicator is further based on position data, optical information, sound information, and/or motion information concerning the luggage item;
- the composite visual dissemination indicator is determined as a function of the density of the individuals around the luggage item;
- the shell of the luggage item is substantially rigid, the first outer face and the first electronic display device are substantially planar and lie in a plane of extension, and the total area of the first electronic display device is greater than fifty percent of the total area of the first outer face;
- the shell of the luggage item further comprises a second outer face on which is mounted a second electronic display device, the second outer face and the second electronic display device are substantially planar and lie in the plane of extension, the first outer face and the second outer face are opposite one another along a widthwise direction that is substantially perpendicular to the plane of extension, the control device is adapted to control the second electronic display device, and the second electronic display device is adapted to present visual information in the direction of the environment external to the luggage item;

the luggage item further comprises a foldable support mounted on an outer face of the shell of the luggage item, adapted to allow placing the luggage item in a fixed manner on an external surface, in particular four foldable feet.

The invention also relates to a luggage item for a system for disseminating visual information, the luggage item being of the type having a shell between the environment external to the luggage item and the internal volume of the luggage item adapted to allow the transport of personal effects, the luggage item comprising a first electronic display device mounted on an outer face of the shell of the luggage item, the first electronic display device being adapted to present visual information in the direction of the environment external to the luggage item, a position acquisition device adapted to acquire position data as a function of the spatial position of the luggage item, a device for communicating with a remote server of a system for disseminating visual information, adapted to receive visual information from the remote server and to transmit position data to the remote server, and a control device adapted to store the visual information and the position data and to control the first electronic display device.

BRIEF DESCRIPTION OF THE DRAWINGS

Other features and advantages of the invention will be apparent from the following description of one of its embodiments, given by way of non-limiting example, with reference to the accompanying drawings.

In the drawings.

DETAILED DESCRIPTION OF THE INVENTION

In the various figures, the same references designate identical or similar elements.

Figure 1:
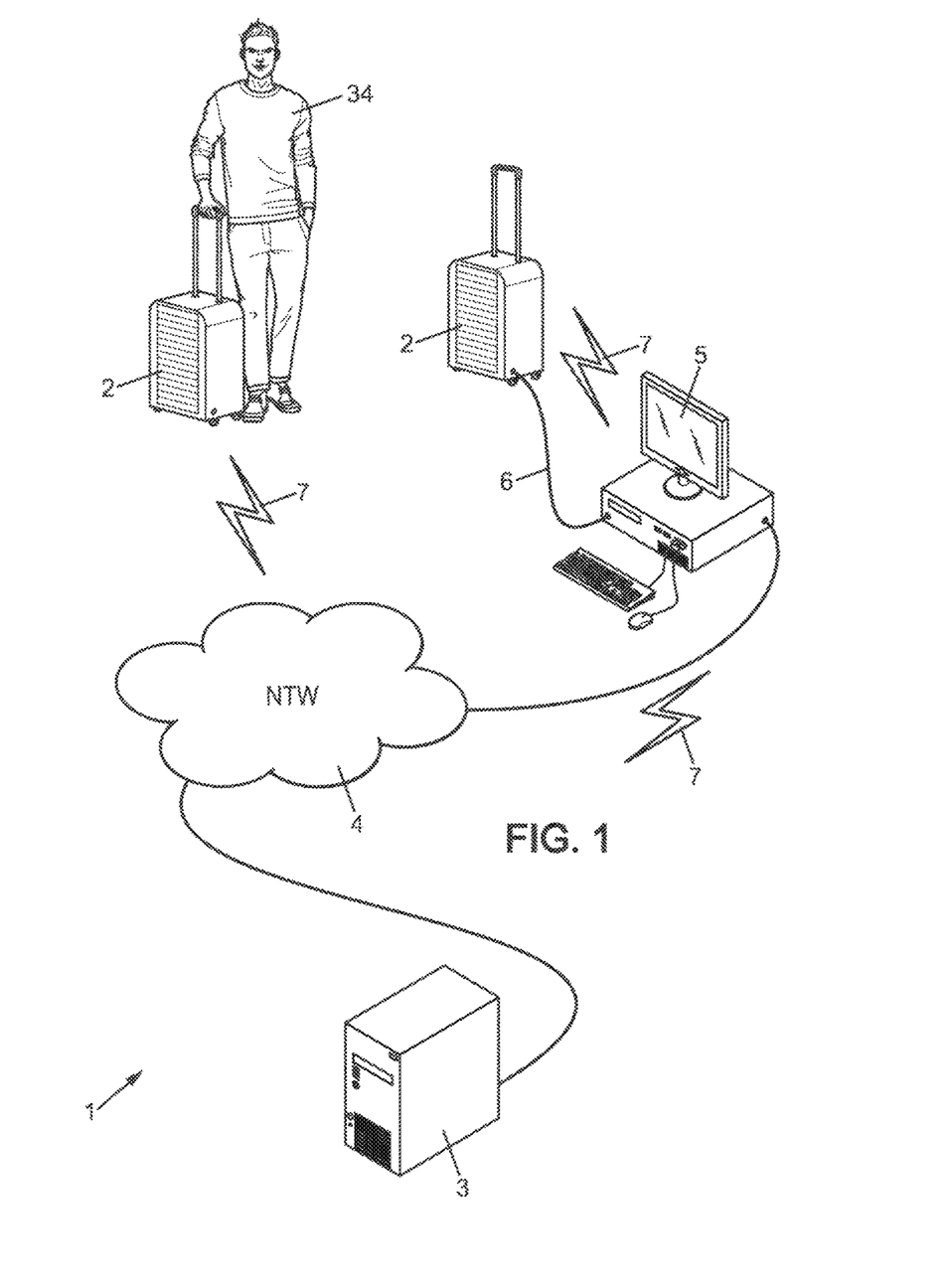
FIG. 1 is a block diagram illustrating a system for disseminating visual information according to an embodiment of the invention.

FIG. 1 shows a system 1 for disseminating visual information according to the invention.

Such a system comprises one or more luggage items communicating with a remote server 3 by means of a wide area network 4.

The term luggage item 2 is used in the following description, but can be understood as referring to suitcases, bags, trunks, hard-sided briefcases, purses, and more generally all containers for transporting small objects or living things, for example during a trip, and generally able to be lifted off the ground by a single person without assistance.

The wide area network 4 may comprise, for example, an Internet network. The wide area network 4 may in particular comprise a private local area network, a metropolitan area network or MAN, a wide area network 4 or WAN, the Internet, or combinations of these, combinations that may for example include virtual private networks. The wide area network 4 may further comprise a wireless wide area network or WWAN, also known as a mobile telecommunication cellular network or land mobile network, or a wireless local area network or WLAN.

Such a wireless network may, for example, include a plurality of mobile telephony relay antennas called base stations, each enabling communication with mobile terminals present within a defined geographical area. Base stations may be connected, via routing equipment, to a gateway enabling the exchange of data with the wide area network 4. The network formed by such equipment may be one of the following types: Mobitex Radio Network, DataTAC, GSM (Global System for Mobile Communications), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), WiMax (Worldwide Interoperability for Microwave Access), or some other type.

In one embodiment, the luggage item 2 may access the wide area network 4 via a wireless WAN as described above.

In another embodiment, the luggage item 2 may have no possibility of direct connection to the wide area network 4.

In such a variant, the luggage item 2 may then be connected to the wide area network 4 via an external connection device 5.

For example, such an external connection device 5 may be a desktop computer, a laptop computer, a touchpad tablet, or any other electronic device able to connect to the wide area network 4.

The external connection device 5 may be connected to the luggage item by means of a wired connection 6, in particular one of or a combination of an Ethernet connection, a USB interface (acronym for "Universal serial Bus"), a Firewire interface (also known as an IEEE1394 interface), an optical communication interface such as a fiber optic connection, or some other interface for the serial exchange of data, via the respective ports or interfaces of the remote client.

The external connection device 5 may also be connected to the luggage item 2 by means of a wireless connection 7, in particular one of or a combination of a connection via a wireless local area network such as a WiFi network, or a wireless point to point connection 7, for example a connection by radio waves, in particular by short wave radio such as a "Bluetooth" connection.

In general, the luggage item 2 may be connected to the wide area network 4 directly or through a router or firewall.

Figure 2:
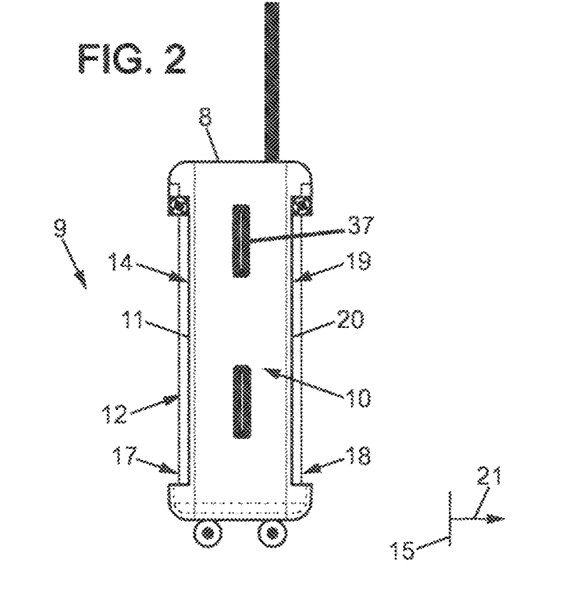
FIG. 2 is a side view of a luggage item according to one embodiment of the invention.
Figure 3:
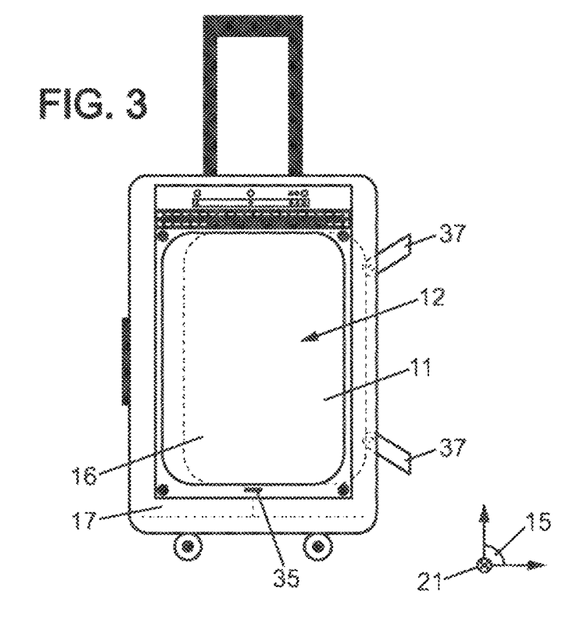
FIG. 3 is a front view of the luggage item of FIG. 2.

As illustrated in FIGS. 2 and 3, the luggage item 2 is of the type having a shell 8 between the environment 9 external to the luggage item 2 and an internal volume 10 of the luggage item 2.

The internal volume 10 allows, for example, the transport of personal effects.

The luggage item 2 comprises in particular a first electronic display device 11 mounted on a first outer face 12 of the shell 8 of the luggage item 2.

The first electronic display device 11 is adapted to present visual information 13 in the direction of the environment 9 external to the luggage item 2.

The visual information 13 is, for example, animated or static information, movies or news, advertisements or items to be communicated.

The first electronic display device 11 is, for example, an electronic screen, in particular an LED or OLED display.

In one embodiment of the invention, the first electronic display device 11 may be protected from the external environment 9 by a protective flap 14 adapted to be interposed between the first electronic display device 11 and the environment 9 external to the luggage item 2.

The protective flap 14 may in particular be a motorized flap, for example a flap deployed by an electric motor.

In another embodiment of the invention, the first electronic display device 11 may be protected from the external environment 9 by a thick transparent wall.

More particularly, in the example of FIGS. 2 and 3, the shell 8 of the luggage item 2 may be substantially rigid.

The first outer face 12 and the first electronic display device 11 may be substantially planar and lie in a plane of extension 15.

The total area 16 of the first display device may be greater than fifty percent of the total area 17 of the first outer face.

In this manner, the surface area covered by the first electronic display device 11 can be sufficient to provide a good quality display of the visual information 13, the visual information 13 thus being visible at a distance far from the luggage item 2.

The shell 8 of the luggage item 2 may further comprise a second outer face 19 on which is mounted a second electronic display device 20.

The second electronic display device 20 may in particular be adapted to present visual information 13 in the direction of the environment 9 external to the luggage item 2.

The second electronic display device 20 may comprise all or part of the features and characteristics described for the first electronic display device 11.

The second outer face 19 may also comprise all or part of the features and characteristics described for the first outer face 12.

The second outer face 19 and the second electronic display device 20 may be substantially planar and lie in the plane of extension 15.

The first outer face 12 and the second outer face 19 may be opposite one another along the widthwise direction 21 that is substantially perpendicular to the plane of extension 15.

The first outer face 12 and the second outer face 19 may thus form two opposite faces of the luggage item 2.

In one embodiment wherein the luggage item 2 has the general shape of a rectangular parallelepiped, the first outer face 12 and second outer face 19 may in particular be the two largest faces of said rectangular parallelepiped.

Lastly, the first outer face 12 and the second outer face 19 may have substantially the same dimensions, and the total surface area of the first outer face 17 may be substantially equal to the total surface area of the second outer face 18.

In this manner, the visual information 13 can be visible at great distances from the luggage item 2 and in all spatial directions, or at least in a large number of spatial directions.

In addition, the luggage item 2 comprises a position acquisition device 22 capable of acquiring position data 23. The position data 23 are, for example, a function of the spatial position 42 of the luggage item 2.

The position acquisition device 22 is thus, for example, a receiver of a global positioning system, for example a system such as those usually identified by the acronym GPS for Global Positioning System.

The position acquisition device 22 is thus able in particular to communicate with satellites in order to acquire position data 23 as a function of the position of the suitcase relative to the Earth's surface.

In one embodiment of the invention, the luggage item 2 may include an inertial sensor 46 adapted to sense motion information for the luggage item 2.

The inertial sensor 46 may be an accelerometer, an inclinometer, a gyroscope, a rate gyroscope, or some other inertial device.

The motion information captured for the luggage item 2 may be associated with a moment of acquisition.

In particular, the motion information for the luggage item 2 may be associated with position data 23.

In the rest of the description that follows, when referring to an embodiment of the luggage item 2 having an inertial sensor 46, "position data" can therefore be understood to mean the data acquired by the position acquisition device 22 and by the inertial sensor 46, the position data then including information on the movement of the luggage item 2.

In one embodiment of the invention, the luggage item 2 may also include an optical sensor 24 adapted to capture optical information 25 from the environment 9 external to the luggage item 2.

The optical sensor 24 may be a video camera, a laser transmission and reception system, or some other optical device.

The captured optical information 25 may, for example, be a function of the density of individuals around the luggage item 2. In particular, the captured optical information 25 may be associated with a moment of acquisition.

In an alternative embodiment, the luggage item 2 may also comprise a sound sensor 26 adapted to capture sound information 27 from the environment 9 external to the luggage item 2.

Again, the captured sound information 27 may be a function of the density of individuals around the luggage item 2, and in particular may be associated with a moment of acquisition.

The luggage item 2 may also include one or more sound dissemination devices 28, for example audio speakers, to enable the dissemination of sound information in addition to visual information 13.

In the following description, it is understood that the term "visual information" also covers "sound information".

In particular, the luggage item 2 may be used for private or semi-private dissemination of audiovisual videos.

The luggage item 2 further comprises a communication device 29. The communication device 29 is capable of communicating with the remote server 3 via the wide area network 4 as described above.

The communication device 29 is adapted in particular for receiving visual information 13 from the remote server 3.

Finally, the luggage item 2 comprises a control device 30 adapted to store the visual information 13 and the position data 23 and to control the first electronic display device 11 and, if applicable, the second electronic display device 20.

The control device 30 is thus connected to the first electronic display device 11, the position acquisition device 22, the communication device 29, and if applicable, the second electronic display device 20.

The control device 30 controls in particular the first electronic display 11, and if applicable, the second electronic display device 20, in order to present visual information 13 in the direction of the environment 9 external to the luggage item 2.

In one embodiment of the invention, the control device is adapted in particular for controlling the first electronic display device 11, and if applicable, the second electronic display device 20, between a dissemination state 31 in which the first electronic display device 11, and if applicable the second electronic display device 20, present(s) the visual information 13 in the direction of the environment 9 external to the luggage item 2, and an inactive state 32 in which the first electronic display device 11, and if applicable the second electronic display device 20, do(es) not present visual information 13 in the direction of the environment 9 external to the luggage item 2.

In particular, the control device 30 is adapted to store a state indicator of the display device 33, adapted to indicate if the first electronic display device 11, and if applicable the second electronic display device 20, is (are) in the dissemination state 31 or in the inactive state 32. The state indicator of the display device 33 is, for example, a Boolean flag that can have one of two values.

The control device 30 can control the first electronic display device 11, and if applicable the second electronic display device 20, to change between the dissemination state 31 and the inactive state 32, when so instructed by the user 34 of the suitcase. Thus, in particular, the luggage item 2 may comprise a display state control 35 that can be actuated by the user and is adapted to allow switching the first electronic display device 11, and if applicable the second electronic display device 20, between the dissemination state 31 and the inactive state 32.

The display state control 35 may be directly mounted on the luggage item 2 or may comprise a remote control, for example an electronic remote control, associated with a receiver integrated into the luggage item 2.

The communication device 29 is further adapted to transmit the position data 23 to the remote server 3.

The communication device 29 may also be adapted to transmit the optical information 25 or the sound information 27 to the remote server 3.

Finally, the communication device 29 may also be adapted to transmit the motion information of the luggage item 2 to the remote server 3.

In an alternative embodiment, the communication device 29 may be adapted to transmit a composite visual dissemination indicator 36 to the remote server 3. The composite visual dissemination indicator 36 may be a function of the state indicator of the display device 33 which indicates whether the display device is in the dissemination state 31 or the inactive state 32. The composite visual dissemination indicator 36 may also be a function of the position data 23, optical information 25, sound information 27, and/or motion information 2 concerning the luggage item 2.

A composite indicator may in particular be determined as a function of the density of individuals around the luggage item 2.

The position acquisition device 22, the communication device 29, and the control device 30 may in particular be circuits, circuit boards, processors, programmable logic devices.

Lastly, the luggage item 2 may comprise a foldable support 37 mounted on an outer face of the shell 8 of the luggage item 2, in particular a foldable support 37 consisting of several foldable feet, for example four foldable feet.

The foldable support 37 may be adapted to allow placing the luggage item in a fixed manner on an external surface.

The foldable support 37 may in particular be arranged on a third outer face of the shell 8 of the luggage item 2, different from the first outer face 12 and second outer face 19.

Figure 4:
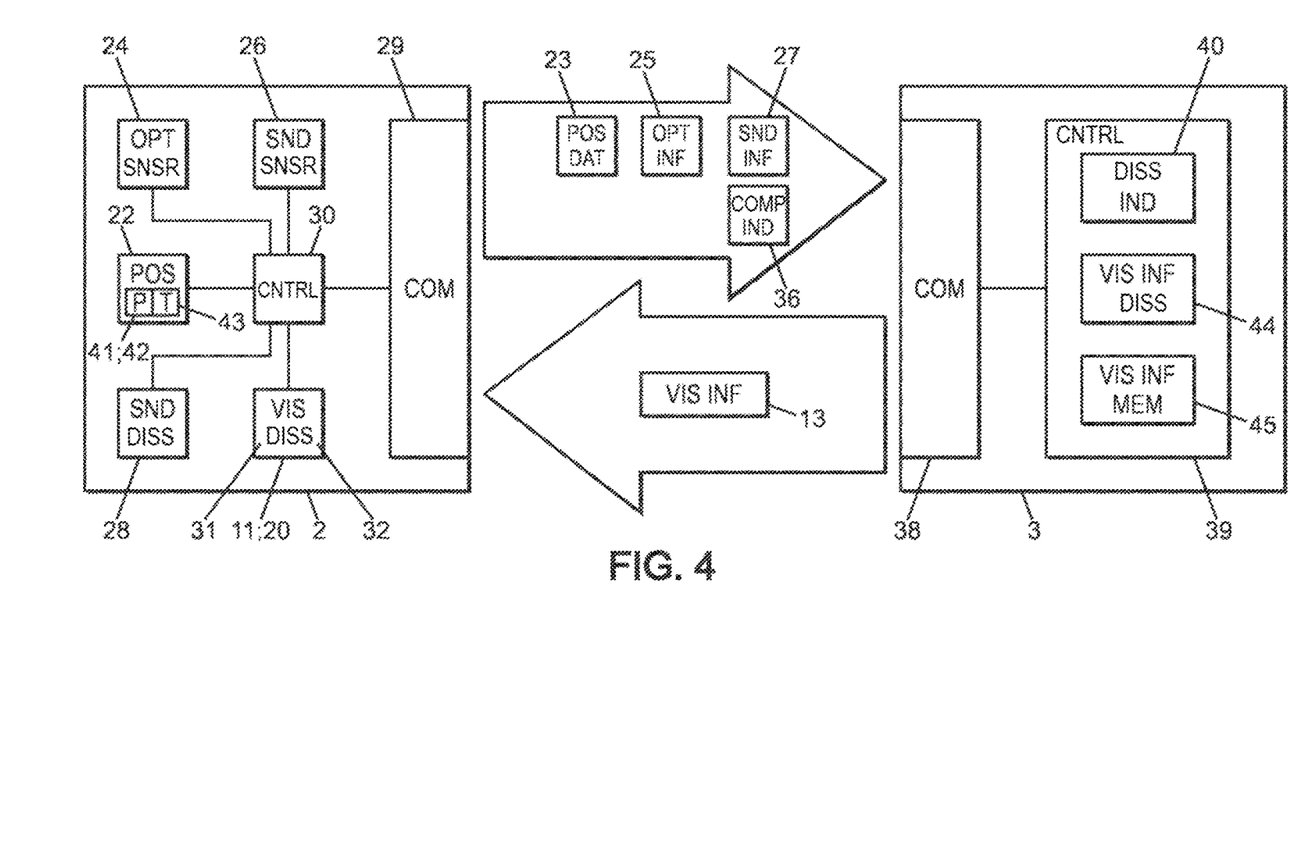
FIG. 4 is a block diagram illustrating a system for disseminating visual information according to an embodiment of the invention.

Referring now also to FIG. 4, the remote server 3 comprises a unit 38 for communicating with the luggage item 2, adapted to transmit visual information 13 to the luggage item 2 and to receive position data 23 from the luggage item 2. The communication unit 38 is able to communicate with the luggage item 2 by means of the wide area network 4 as described above. The communication unit 38 is particularly suitable for communicating with the communication device 29 of the luggage item 2.

The remote server 3 further comprises a control unit 39.

In one embodiment, the remote server 3 may comprise a computer. The communication unit 38 and the control unit 39 may in particular be circuits, circuit boards, processors, programmable logic devices, for example integrated in said computer.

The remote server 3 may optionally include a screen and a keyboard to enable simple interaction with a user.

The control unit 39 is first and foremost adapted to store the visual information 13, the position data 23, and where appropriate the optical information 25, the sound information 27, and/or the composite visual dissemination indicator 36.

The control unit 39 is also able to control the unit 38 for communicating with the luggage item 2 in order to send visual information 13 to the luggage item 2 and to receive from the luggage item 2 the position data 23 and, where appropriate, the optical information 25, the sound information 27, the information concerning movement of the luggage item 2, and/or the composite visual dissemination indicator 36.

Finally, in a first embodiment, the control unit 39 is able to determine the visual information 13 to be transmitted to the luggage item 2 as a function of position data 23 received from the luggage item 2, and in particular as a function of the spatial positions of the luggage item 2 at the moments of acquisition as will be described in more detail.

In a second embodiment, which may be combined with the first embodiment, the control unit 39 is able to determine a visual information dissemination indicator 40 as a function of the distance 41 traveled by the luggage item with the display device in the dissemination state 31, as will now be described in more detail.

FIG. 4 shows a more detailed flowchart of the operation of a system 1 for disseminating visual information according to an embodiment of the invention.

In this embodiment, the position acquisition device 22 is adapted to acquire and save a plurality of position data 23 for luggage item 2.

In a first embodiment of the invention, the position data 23 for the luggage item 2 include a spatial position 42 of the luggage item 2 at the moment of acquisition 43 and a temporal value indicative of the moment of acquisition 43.

The luggage item 2 may transmit said position data 23, containing the spatial positions of the luggage item 2 at moments of acquisition as well as temporal values indicative of the moment of acquisition 43, to the remote server 3.

The remote server 3 thus receives from the luggage item 2 the spatial positions of the luggage item 2 at the moments of acquisition; the control unit 39 can thus be adapted to determine the visual information 13 to be transmitted to the luggage item 2 as a function of the position data 23 received from the luggage item 2, and in particular as a function of the spatial positions of the luggage item 2 at the moments of acquisition.

In particular, the control unit 39 may be adapted to select the visual information to be disseminated 44 among the visual information 45 stored on the remote server 3.

Thus, the position data 23 can allow the control unit 39 to determine the visual information 13 to be transmitted to the luggage item 2, adapted for example to the language or culture of the country or the region where the luggage item 2 is located.

The luggage item 2 may also transmit to the remote server 3 one or more state indicator values indicating the state of the display device 33, for example associated with the moments of acquisition, for example associated with temporal values indicative of the moment of acquisition 43.

The luggage item may also transmit to the remote server 3 the optical information 25, the sound information 27, and/or the composite visual dissemination indicators.

The control unit 39 of the remote server 3 can then determine a visual information dissemination indicator 40 as a function of the distance 41 traveled by the luggage item with the display device in the dissemination state 31.

Such an indicator may, for example, correspond to the distance 41 traveled by the luggage item with the first electronic display device 11, and if applicable the second electronic display device 20, in the dissemination state 31 as determined from the position data 23 and the state indicator values indicating the state of the display device 33 received by the remote server 3 from the luggage item 2.

In a first embodiment, such an indicator may be for example substantially equal to a distance 41 traveled by the luggage item with the first electronic display device 11, and if appropriate the second electronic display device 20, in the dissemination state 31.

In a second embodiment of the invention, each item of position data may include a distance 41 traveled by the luggage item, in particular a distance 41 traveled by the luggage item with the first electronic display device 11, and if appropriate the second electronic display device 20, in the dissemination state 31.

In this second embodiment in particular, the distance traveled by the luggage item may be calculated as a function of the motion information of the luggage item 2 that was acquired by means of the inertial sensor 46.

The luggage item 2 transmits said position data 23 to the remote server 3.

In this embodiment as well, the luggage item 2 may transmit to the remote server 3 one or more state indicator values for the display device 33, for example at the moments of acquisition, for example associated with temporal values indicative of the moment of acquisition 43.

The control unit 39 of the remote server 3 can then determine a visual information dissemination indicator 40 as a function of the distance 41 traveled by the luggage item with the display device in the dissemination state 31.

In variations of the first and second embodiment, a visual information dissemination indicator 40 may be determined more generally as a function of the position data 23, state indicator values of the display device 33, optical information 25, sound information 27, and/or composite visual dissemination indicators received by the remote server 3 from the luggage item 2.

In this manner, the visual information dissemination indicator 40 may be close to an estimate of the number of people in the environment 9 external to the suitcase who are in a position to consume the visual information 13.

The invention is described above as an example. It is understood that the skilled person will be able to create different embodiments of the invention without departing from the scope of the invention.

Many objects and methods described herein appear innovative, regardless of the object whose characteristics are the object of one or more of the claims. For these innovative objects or methods, some of the features described as essential for the initially claimed objects or methods may be optional.

The invention claimed is:

1. A system for disseminating visual information, comprising:
    a luggage item, the luggage item being of the type having a shell between the environment external to the luggage item and an internal volume of the luggage item adapted to allow the transport of personal effects, the luggage item comprising a first electronic display device mounted on a first outer face of the shell of the luggage item, the first electronic display device being adapted to present visual information in the direction of the environment external to the luggage item,
    wherein the system for disseminating visual information further comprises a remote server for the luggage item, the luggage item further comprises:
        a position acquisition device, adapted to acquire position data as a function of the spatial position of the luggage item,
        an optical sensor and a sound sensor to acquire optical information and sound information from the environment external to the luggage item, the optical information and the sound information being functions of the density of individuals around the luggage item,
        a device for communicating with the remote server, adapted to receive visual information and to transmit a composite visual dissemination indicator as well as the position data to the remote server, the composite visual dissemination indicator being based on each of the position data, the optical information, and the sound information, and the composite visual dissemination indicator being determined as a function of the density of the individuals around the luggage item, said density of individuals around the luggage item being acquired via the optical sensor and the sound sensor, and
        a control device, adapted to store the visual information and the position data and to control the first electronic display device, and
    the remote server comprises:
        a unit for communicating with the luggage item, adapted to transmit the visual information to the luggage item and to receive the position data and the composite visual dissemination indicator from the luggage item,
        a control unit adapted to store the visual information, the position data, the optical information and the sound information and the composite visual dissemination indicator and to control the unit for communicating with the luggage item,
    the control unit being adapted to determine the visual information to be transmitted to the luggage item as a function of the position data and the composite visual dissemination indicator received from the luggage item, and
    wherein the control unit is configured to select, based on the position data of the luggage item, a language in which the visual information is to be disseminated from among the visual information stored on the remote server, the language being the language of the country where the luggage item is located such that the displayed visual information is intelligible to observers.

2. The system according to claim 1, wherein the position acquisition device is adapted to acquire and save a plurality of the position data of the luggage item, each item of the position data of the luggage item being a function of the spatial position of the luggage item at the moment of acquisition and being associated with a temporal value indicative of the moment of acquisition.

3. The system according to claim 1,
wherein the control device is adapted to control the first electronic display device between:
   a dissemination state in which the first electronic display device presents the visual information in the direction of the environment external to the luggage item, and
   an inactive state in which the first electronic display device does not present the visual information in the direction of the environment external to the luggage item,
and wherein the control unit of the remote server is adapted to determine a visual information dissemination indicator as a function of the distance traveled by the luggage item with the first electronic display device in the dissemination state.

4. The system according to claim 1, wherein the device for communicating with the remote server communicates with the remote server via a wide area network, in particular an Internet network.

5. The system according to claim 1, wherein the composite visual dissemination indicator is further based on a state indicator of the display device which indicates whether the display device is in the dissemination state or the inactive state.

6. The system according to claim 1, wherein the composite visual dissemination indicator is further based on motion information concerning the luggage item.

7. The system according to claim 1, wherein
the shell of the luggage item is substantially rigid,
the first outer face and the first electronic display device are substantially planar and lie in a plane of extension, and
the total area of the first electronic display device is greater than fifty percent of the total area of the first outer face.

8. The system according to claim 7, wherein
the shell of the luggage item further comprises a second outer face on which is mounted a second electronic display device,
the second outer face and the second electronic display device are substantially planar and lie in the plane of extension,
the first outer face and the second outer face are opposite one another along the widthwise direction that is substantially perpendicular to the plane of extension,
the control device is adapted to control the second electronic display device, and
the second electronic display device is adapted to present the visual information to the environment external to the luggage item.

9. The system according to claim 1, wherein the luggage item further comprises a foldable support mounted on an outer face of the shell of the luggage item, adapted to allow placing the luggage item in a fixed manner on an external surface, in particular four foldable feet.

10. A luggage item for a system for disseminating visual information, the luggage item being of the type having a shell between the environment external to the luggage item and the internal volume of the luggage item adapted to allow the transport of personal effects, said luggage item comprising:
   a first electronic display device mounted on an outer face of the shell of the luggage item, the first electronic display device being adapted to present visual information in the direction of the environment external to the luggage item,
   a sound sensor adapted to capture sound information from the environment external to the luggage item, the sound information being a function of the density of individuals around the luggage item,
   an optical sensor adapted to capture optical information from the environment external to the luggage item, the optical information being a function of the density of individuals around the luggage item,
   a position acquisition device adapted to acquire position data as a function of the spatial position of the luggage item,
   a device for communicating with a remote server of a system for disseminating visual information, adapted to receive visual information from the remote server and to transmit the position data, the optical information, and the sound information to the remote server, and
   a control device adapted to store the visual information and the position data and to control the first electronic display device,
   wherein the control unit is configured to select, based on the position data of the luggage item, a language in which the visual information is to be disseminated, the language being the language of the country where the luggage item is located.

11. A method for disseminating visual information in the direction of the environment external to a luggage item,
   the luggage item being of the type having a shell between the environment external to the luggage item and an internal volume of the luggage item adapted to allow the transport of personal effects, the luggage item comprising a first electronic display device mounted on a first outer face of the shell of the luggage item, the first electronic display device being adapted to present visual information in the direction of the environment external to the luggage item,
   the method comprising the steps of:
      providing a plurality of visual information to be stored on a control unit of a remote server,
      acquiring a plurality of position data as function of the spatial position of the luggage item,
      storing the plurality of the position data associated with a temporal value indicative of the moment of acquisition within a control device comprised in the luggage item,
      acquiring an optical information and a sound information from the environment external to the luggage item with an optical sensor and a sound sensor comprised in the luggage item, the optical information and the sound information being functions of the density of individuals around the luggage item, said density being acquired via the optical sensor and the sound sensor,
      transmitting to a remote server the position data and the optical information and the sound information, determining with a control unit of the remote server a visual information to be disseminated by the luggage item as a function of the position data and the optical information and the sound information, the visual information being determined among visual information stored on the remote server, transmitting the visual information to be disseminated to the luggage item, and displaying the visual information on the first electronic display device of the luggage item, wherein the control unit selects, based on the position data of the luggage item, a language in which the visual information is to be disseminated from among the visual information stored on the remote server, the language being the language of the country where the luggage item is located such that the displayed visual information is intelligible to observers of the country in which the luggage item is located.

* * * * *